United States Patent [19]

Abbestam et al.

[11] Patent Number: 5,247,789
[45] Date of Patent: Sep. 28, 1993

[54] PLASTIC CHAIN COMPRISING MOUNTABLE GUIDE MEANS AND/OR MOUNTABLE MEANS

[75] Inventors: Göran Abbestam, Partille; Leif Lachonius, Surte, both of Sweden

[73] Assignee: SKF Specialty Products AB, Gothenburg, Sweden

[21] Appl. No.: 808,779

[22] Filed: Dec. 17, 1991

[30] Foreign Application Priority Data

Dec. 21, 1990 [SE] Sweden .................. 9004102

[51] Int. Cl.⁵ .................................. F16G 13/08
[52] U.S. Cl. .................................. 59/78; 59/84; 59/93; 198/851
[58] Field of Search .......... 59/78, 84, 93, 35.1; 198/850, 851, 853

[56] References Cited

U.S. PATENT DOCUMENTS

| | | | |
|---|---|---|---|
| 4,832,187 | 5/1989 | Lapeyre | 198/851 |
| 4,953,693 | 9/1990 | Draebel | 198/853 |
| 4,993,544 | 2/1991 | Bailey et al. | 198/853 |
| 5,000,312 | 3/1991 | Damkjeer | 198/853 |

FOREIGN PATENT DOCUMENTS

| | | | |
|---|---|---|---|
| 0172745 | 2/1986 | European Pat. Off. | 198/851 |
| 0175483 | 3/1986 | European Pat. Off. | 198/853 |
| 0288409 | 10/1988 | European Pat. Off. | |
| 3913077 | 11/1989 | Fed. Rep. of Germany. | |
| 2091200 | 7/1982 | United Kingdom | 198/851 |
| 2153323 | 8/1985 | United Kingdom. | |
| 2055731 | 3/1991 | United Kingdom. | |

*Primary Examiner*—David Jones
*Attorney, Agent, or Firm*—Burns, Doane, Swecker & Mathis

[57] ABSTRACT

A plastic chain includes chain elements that are connected to one another by way of connecting shafts, rods or similar devices. The chain elements include a recess in which is received a connecting element. The connecting element can have a guide element extending therefrom for guiding the chain, and a locking element extending therefrom for restraining axial movement of the connecting shafts.

11 Claims, 4 Drawing Sheets

5,247,789

PLASTIC CHAIN COMPRISING MOUNTABLE GUIDE MEANS AND/OR MOUNTABLE MEANS

FIELD OF THE INVENTION

The present invention relates to a plastic chain. More particularly, the present invention pertains to a plastic chain comprising chain elements which are connected to each other via connecting shafts, rods or similar devices, and guide means for guiding the chain. The invention further relates to a guide means for guiding a plastic chain and a locking means for locking shafts, rods or similar connecting means that are employed for connecting chain elements in a plastic chain.

BACKGROUND OF THE INVENTION

In a plastic chain that includes a plurality of chain elements, the respective chain elements are connected to one another by way of shafts perpendicularly arranged with respect to the longitudinal axis of the plastic chain. However, the shafts have to be locked in place to keep the chain assembled. Utilizing separate chain elements allows for the assembly of chains of various widths and so on. Additionally, the chain normally has to be guided both laterally and horizontally. Thus, it can be seen that limiting factors with respect to flexibility concerning chain variations include, on the one hand, the locking of the shaft and on the other hand, the guiding of the chain by guiding means.

As far as the locking of the shafts is concerned, the state of the art presents in principle two solutions. In accordance with one solution, plastic shafts are used. In this case, a common way of locking the shaft in place is to deform the end of the shaft by melting. The use of this technique, however, naturally results in the shafts not being reusable. Moreover, dismantling the chain elements becomes more difficult in that a destruction of the shaft (or the chain element) is required.

Another solution involves the use of steel shafts. These steel shafts can be machined in any suitable way and then locked in place by way of locking washers or the like. (See, for example, U.S. Pat. No. 4,832,187 or EP-A 288,409). In either of the aforementioned cases, the flexibility is severely limited and the production becomes more expensive.

For guiding plastic chains and for maintaining them in place, guiding pins are used. These guiding pins can be designed to guide a chain both laterally and vertically in relation to the plane of movement. Already known solutions, however, only employ guiding pins that are cast or otherwise manufactured in one piece with the chain element. The guiding pin is thereby fixed in one particular position with respect to the chain. The possibility of using one and the same chain element in chains with different shapes and of different types is thereby limited. In order to manufacture as large a variety of plastic chains as desired, a multitude of different variations of the chain element is required.

SUMMARY OF THE INVENTION

The invention has as one purpose to enable the production as simple and cheap as possible of components in a plastic chain, thereby obtaining the maximum possible flexibility in mounting, changing and dismounting chains of different shapes. The present invention makes it possible to produce plastic chains in a cheap and simple way in various shapes and sizes. Since the locking means and/or the guide means are mountable by way of a connecting element, which, for example, is slid and snapped into a chain element, a large variety of choices is obtained. Thus, for example, the chain width can easily be modified as can the position of the guiding elements. Moreover, the various elements can be easily exchanged. Because the connecting shafts or rods are retained by way of a locking means without any interference with the shaft and without the need for any special shape of the shaft, one type of shaft can be manufactured which is useable with different chains and the shaft can then be cut to a suitable length. Such a shaft which is not affected during assembly or dismantling can of course be reused.

It is sometimes desirable to have guiding means within the chain itself in an optional position and according to the present invention, a removable guide means is provided. Alternatively, the locking element of a connecting element that is equipped with both a locking element and a guiding element can be cut off or otherwise removed. Further, shorter shafts can be used which are locked by means of respective locking elements at each guiding element that is combined with a locking element.

The different embodiments of the invention have in common that various components can be manufactured, assembled and dismantled, separately or in combination, by way of a connecting element that is mountable, for example, by a snap-in connection in a recess of a chain element.

BRIEF DESCRIPTION OF THE DRAWING FIGURES

A detailed description of the invention is given here below with reference to the attached drawing figures, in which like elements bear like reference numerals and wherein.

DETAILED DESCRIPTION OF THE PREFERRED EMBODIMENTS

Figures 1, 2:
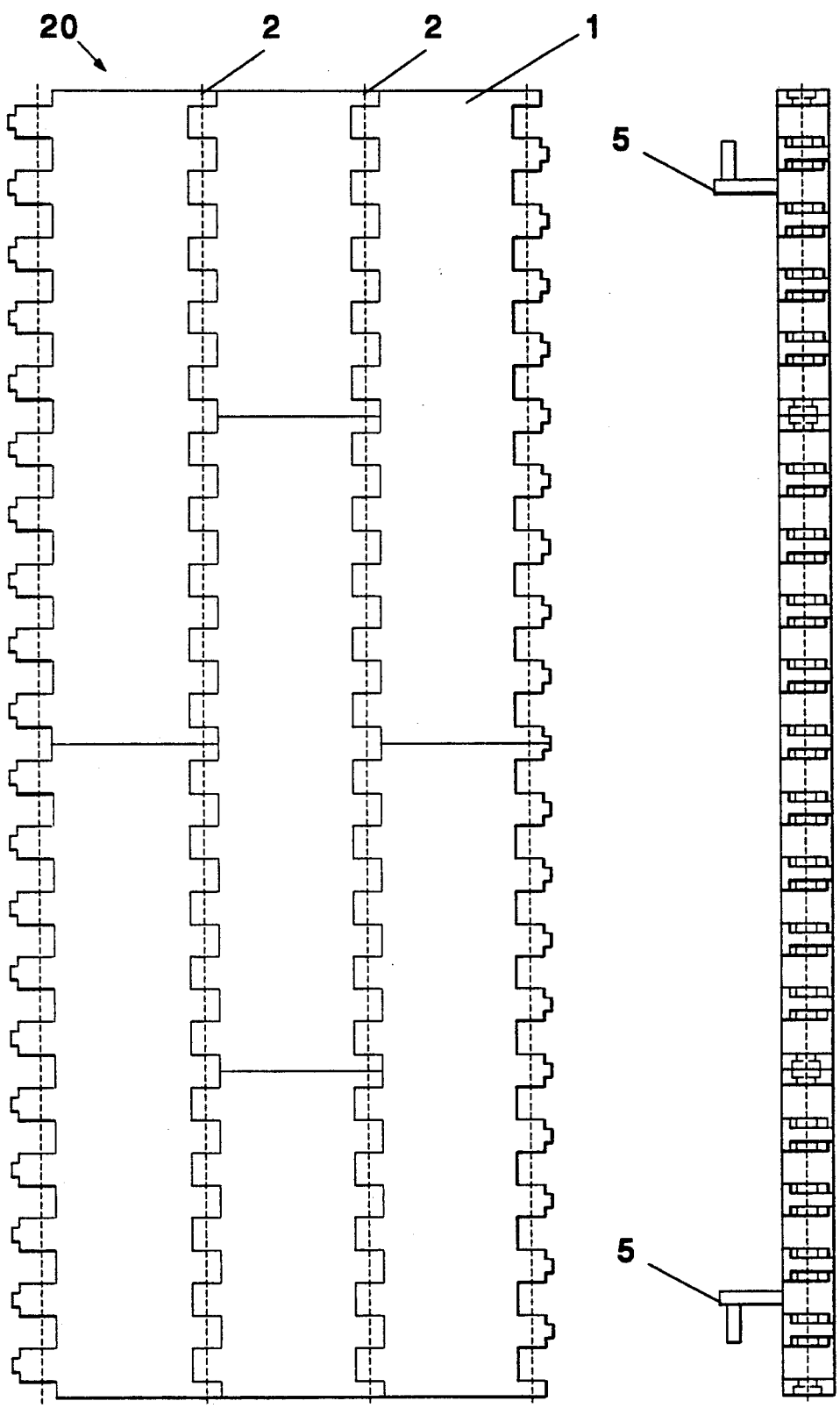
FIG. 1 is a plan view of a longitudinal portion of a plastic chain.
FIG. 2 is a cross-sectional view of the plastic chain of FIG. 1 with mounted guide means.

A plastic chain 20 comprises a number of chain elements 1 which are connected by connecting shafts or rods 2. The connecting shafts or rods 2 extend through aligned bores or apertures that are formed in lugs 15 extending from opposite sides of each chain element 1. The chain elements 1 are formed with recesses 10 (see FIG. 4) that are intended to receive connecting elements 3 which can be mounted therein by way of, for example, a snap-in connection. According to one embodiment a guiding element 6 can be securely attached to, or made in one piece with, the connecting element 3, thus forming a guide means 5 as illustrated in FIG. 5a.

Figure 5A:
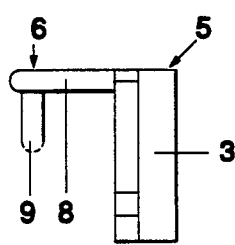
FIG. 5a is a side view of a connecting element with a guiding element.
Figure 5B:
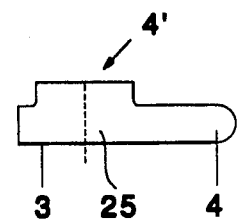
FIG. 5b is an end view of a connecting element with a locking element.

FIG. 5b illustrates another embodiment in which a locking element 4 is securely attached to the connecting element 3, thus forming a locking means 4'.

Figure 5C:
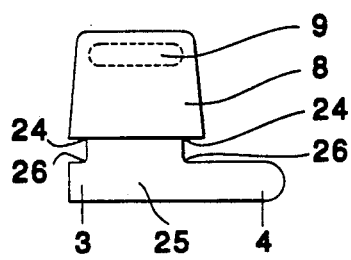
FIG. 5c is an end view of a connecting element with a guiding element and a locking element.
Figure 5D:
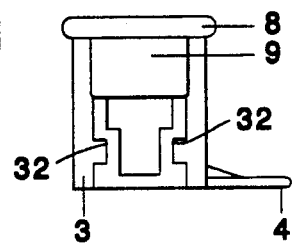
FIG. 5d is a bottom plan view of a connecting element provided with a locking element as well as a guiding element.
Figure 6:
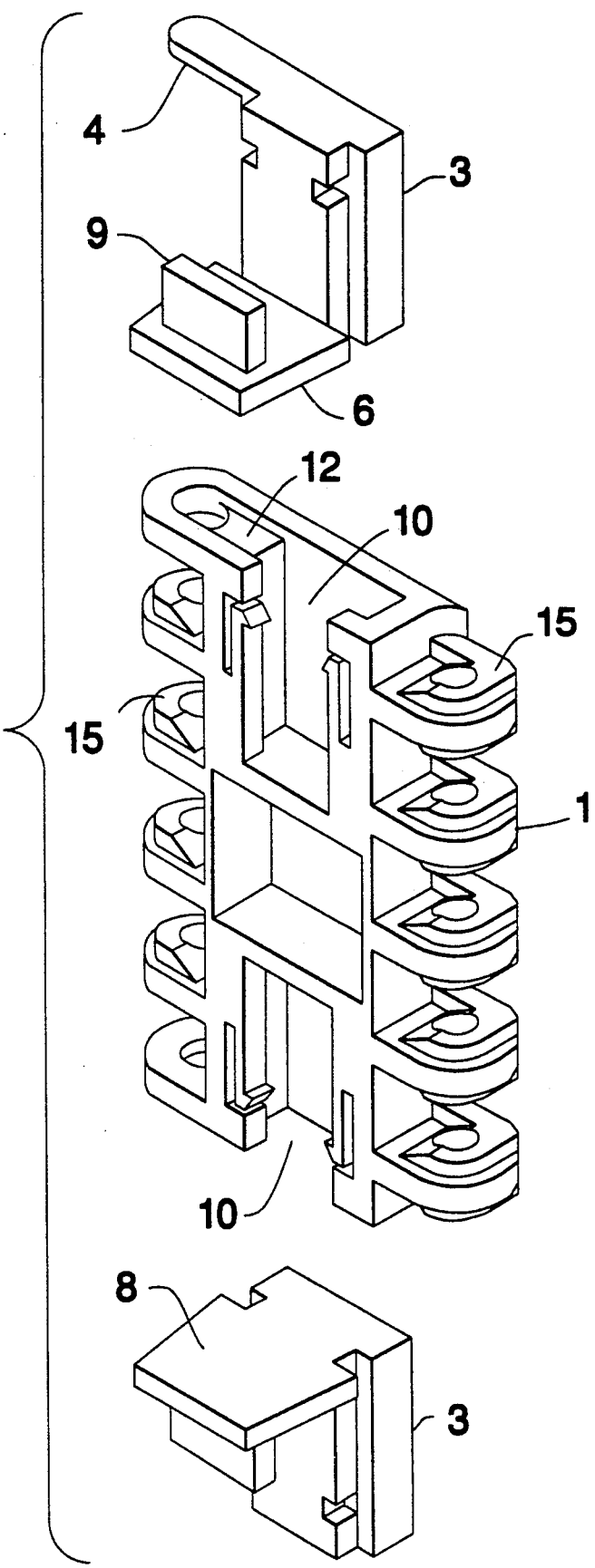
FIG. 6 is an exploded isometric view of a chain element and two connecting elements.

According to a further embodiment, the connecting element 3 can include both a locking element 4 and a guiding element 6 securely attached thereto, or formed in one piece therewith, thus forming the combined locking and guiding means shown in FIGS. 5c and 5d.

Referring mainly to FIG. 5b, a locking means 4' is formed by a connecting element 3 provided with a locking element 4 which is fixed thereto or formed in one piece with the connecting element. Advantageously, the locking element 4 can be an extension of one of the outer surfaces of the connecting element 3 so that the outer surface of the connecting element 3 and the outer surface of the locking element 4 are coplanar as shown in FIG. 5d.

By pushing the connecting element 3 into the recess 10 in a direction perpendicular to the chain longitudinal axis (see arrow A in FIG. 3) the locking element 4 coincides with the chain longitudinal axis and thus makes an angle of 90° with respect to the connecting shaft 2. When the connecting element 3 is mounted in the recess 10, the connecting shaft 2 is axially locked or retained by the locking element 4. Connecting shafts 2 can in this way be assembled, dismantled and reused in a very simple way. As the shaft 2 is not deformed or machined in any way to ensure that it is prevented from falling out of the chain elements, it is sufficient to produce one kind of shaft 2 which can then be cut to the desired length normally adapted to the required chain width. It is also possible to lock or retain shorter shafts 2 within a chain in those cases in which such a design is desired. Moreover, the shafts 2 can be assembled/dismantled without the use of any tools.

When the connecting element is pushed or slid into the recess 10, the inwardly directed shoulders 22 (see FIG. 4) on the chain element 1 engage the inwardly directed recesses 24 (see FIG. 5c) on the connecting element 3. In that way, the surfaces 26 on the connecting element 3 (see FIG. 5c) slide along the bottom surface 28 of the chain element 1 (see FIG. 4). Moreover, the generally rectangular portion 25 of the connecting element 3 is positioned within the correspondingly shaped portion 27 of the recess or groove 10.

Figure 4:
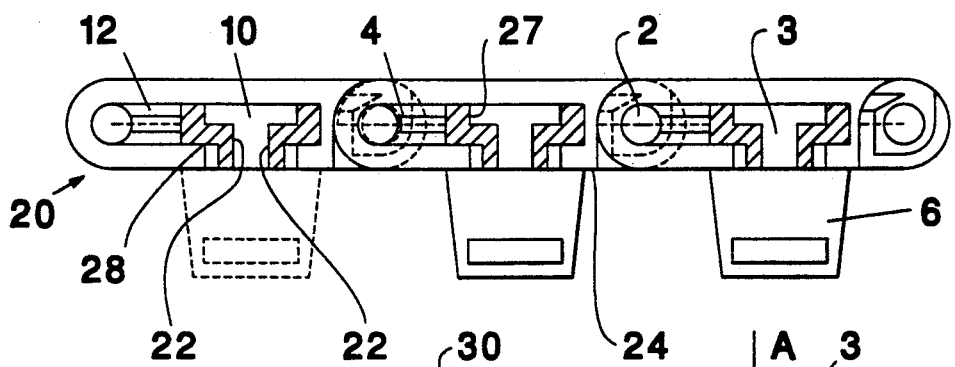
FIG. 4 is a longitudinal cross-sectional view of the chain of FIG. 3 with mounted guide means.

As can be seen from FIG. 4, the recess or groove 10 includes a generally rectangular portion that opens to one side of the chain element. Thus, in cross-section, the generally rectangular portion of the groove or recess 10 considered in conjunction with the inwardly directed shoulders 22 defines a generally T-shaped recess in which the connecting element 3 slides.

Figure 3:
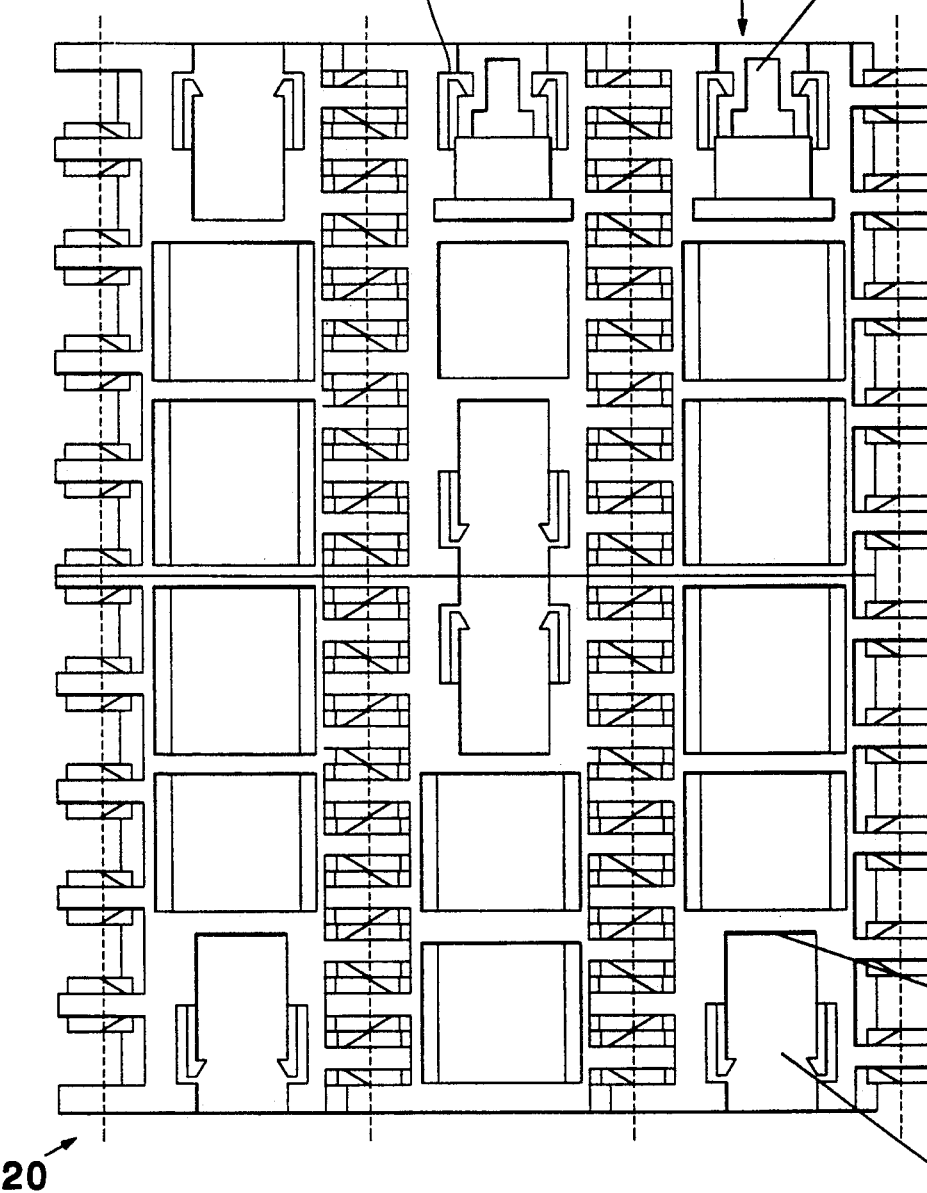
FIG. 3 is a bottom plan view of a plastic chain illustrating recesses with and without mounted connecting elements.

As seen in FIG. 3, the chain elements 1 can be provided with somewhat flexible retainers 30 positioned adjacent opposite sides of the recesses 10. The retainers 30 are generally J-shaped so as to have a small hooked end part.

As seen in FIG. 5d, the connecting elements 3 are provided with oppositely positioned notches 32. As the connecting element 3 is pushed or slid into the recess 10, the hooked end part of the retainers 30 eventually engage the notches 32 in the connecting elements 3 as seen in FIG. 3. This engagement between the hooked end part of the retainers 30 and the notches 32 in the connecting elements 3 serves to retain the connecting elements 3 in place within the recesses 10 in the chain elements. However, because the retainers 30 are flexible, a relatively small amount of force can be applied to the connecting element 3 in order to slide the connecting element 3 out of the recess or groove 10.

Guide means 5 (FIG. 5a) can be used to guide the plastic chain 20. The guide means 5 comprises a connecting element 3 to which a guiding element 6 is connected. The connecting element 3 can then be slid into the recess or groove 10 and maintained by way of a snap-in connection in the recess 10 of the chain element 1. The snap-in connection can be the same as that described above.

The guide means 5 can guide the plastic chain 10 in both the axial direction and the horizontal direction by use of a guiding shoulder. The guiding shoulder can include a first guiding portion 8 (for guiding the chain axially) and a second guiding portion 9 (for guiding the chain perpendicularly with respect to the plane of movement). This makes it possible to mount the guiding elements 6 in a very simple way and in a variety of positions on the plastic chain 20. Additionally, it is also possible to vary the chain 20 and adapt it to various situations.

In the embodiment of the invention which enables maximum flexibility and freedom of choice, the connecting element 3 is provided with both a locking element 4 and a guiding element 6. In FIG. 5c a connecting element 3 with both a locking element and a guiding element 6 is shown from the side, i.e. in the direction in which the element is pushed into the recess or groove 10 in the chain element 1. FIG. 5d shows the same connecting element from underneath, i.e., from the side shown in FIG. 3.

As noted above, the recess 10 in the chain element 1 is designed to include a deep, substantially rectangular recess portion formed in such a way as to enable the reception of a connecting element 3. Additionally, a more shallow recess portion 12 is provided at the end of the chain element 1. The bores through which the connecting shafts 2 extend are formed in this shallow recess portion 12. Moreover, this shallow recess portion 12 extends into the lug 15 provided at the end of the chain element 1. When the connecting element 3 is pushed into the recess 10, the locking element 4 is received in the shallow recess portion 12 of the recess 10 so that the connecting shaft 2 is axially retained without any interference from outside. The depth of the recess portion 12 can be substantially equal to the thickness of the locking element 4 so that the outer surface of the locking element 4 is flush with the end surface of the chain element 1 when the former is received in the latter.

In the case where a connecting element 3 is manufactured with both the locking element 4 and the guiding element 6, but where the use of guiding elements in an optional position within a plastic chain is required, the locking element itself can be cut off. Alternatively, shorter shafts can be used, which are locked at each guiding pin by a corresponding locking element 4.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A plastic chain, comprising:
   a plurality of chain elements connected to one another by way of connecting means, at least some of said chain elements having a recess formed therein;
   at least one connecting element positionable in one of the recesses in one of the chain elements, said connecting element including at least one of a guiding element for aiding in guiding the chain and a locking element for retaining the connecting means in place;
   said connecting means including at least one connecting shaft which extends through aligned apertures in two adjacent chain elements;
   said connecting element including the locking element integrally formed therewith;
   said locking element having an outer surface and said connecting element having an end surface, said locking element extending from one side of the connecting element toward said at least one connecting shaft such that said outer surface of said locking element is coplanar with said end surface of the connecting element;
   said locking element being positionable substantially perpendicular to the connecting shaft in order to axially retain the connecting shaft in said aligned apertures.

2. The plastic chain according to claim 1, wherein said connecting element has a guiding element formed as a part thereof, said guiding element extending outwardly from the connecting element in a direction different from the locking element.

3. The plastic chain according to claim 2, wherein said guiding element includes:
   a first guiding portion that is positioned substantially perpendicular to the connecting element; and
   a second guiding portion having one surface that is positioned substantially parallel to the connecting element and substantially perpendicular to the first guiding portion;
   said first guiding portion guiding the chain in one direction of movement and said second guiding portion guiding the chain in a direction substantially perpendicular to said one direction.

4. A plastic chain, comprising:
   a plurality of chain elements connected to one another by way of connecting means, at least some of said chain elements having a recess formed therein;
   at least one connecting element for being positioned in one of the recesses in one of the chain elements, said connecting element including at least one of a guiding element for aiding in guiding the chain and a locking element for retaining the connecting means in place;
   wherein said connecting element has a locking element connected thereto, said recess in the chain element including a deeper recess portion in which is received the connecting element and an adjacent shallower recess portion in which is received the locking element, said locking element being received in the shallower recess portion so that the locking element forms a planar outer surface of the chain element.

5. A guiding device for guiding a plastic chain which includes a plurality of chain elements that have recesses formed therein and that are connected to one another by connecting means, the guiding device comprising:
   a connecting element;
   a guiding element securely connected to the connecting element;
   said connecting element being configured so as to be removably mounted in one of the recesses in one of the chain elements;
   wherein said guiding element includes:
      a first guiding portion positioned substantially perpendicular to the connecting element;
      a second guiding portion having one surface that is positioned substantially parallel to the connecting element and substantially perpendicular to the first guiding portion;
      said first guiding portion being adapted to guide the chain in one direction of movement of the chain; and
      said second guiding portion being adapted to guide the chain in a direction substantially perpendicular to said one direction.

6. A guiding device for guiding a plastic chain which includes a plurality of adjacent chain elements that each have at least one recess and an aperture which is positioned separate from and on one side of the at least one recess, adjacent chain elements being connected together by a connecting shaft that extends through aligned ones of the apertures in adjacent chain elements, the guiding device comprising:
   a connecting element;
   a guiding element securely connected to the connecting element;
   said connecting element being configured to be removably mounted in the at least one recess in one of the chain elements; and
   a locking element securely attached to the connecting element for retaining the connecting shaft extending through aligned ones of the apertures in two adjacent chain elements, the locking element extending away from one side of the connecting element so that the connecting element can be positioned in the at least one recess of a chain element while the locking element retains the connecting shaft in place in the aligned ones of the apertures in adjacent chain elements.

7. The guiding element according to claim 6, wherein said connecting element, said guiding element and said locking element are formed integrally and in one piece.

8. A guiding device for guiding a plastic chain which includes a plurality of adjacent chain elements that each have at least one recess formed therein and an aperture positioned separate from and on one side of the chain element, adjacent chain elements being connected together by a connecting shaft that extends through aligned ones of the apertures in adjacent chain elements, the guiding device comprising:
   a connecting element;
   a guiding element securely connected to the connecting element;
   said connecting element being configured to be removably mounted in the at least one recess in one of the chain elements; and
   a locking element securely attached to the connecting element for retaining the connecting shaft in the aligned ones of the apertures, said locking element having an outer surface and said connecting element having an end surface, said locking element extending from one side of the connecting element such that said outer surface of the locking element is coplanar with said end surface of the connecting element.

9. A locking device for restraining a connecting means that connects together chain elements of a plastic chain, wherein the chain elements each have at least one recess, and wherein said connecting means is separate from and on one side of the at least one recess, said locking device comprising:

a connecting element;

a locking element securely attached to said connecting element, said connecting element being configured to be removably positioned in one of said recesses in one of said chain elements so that said locking element is positioned for retaining said connecting means;

said locking element having an outer surface and said connecting means having an end surface, said locking element extending from one side of the connecting element such that said outer surface of the locking element is coplanar with said end surface of the connecting element, said locking element being positionable substantially perpendicular to said connecting means.

10. The locking device according to claim 9, further including a guiding element secured to the connecting element for guiding the chain.

11. The locking device according to claim 10, wherein said guiding element is positioned at an end of the connecting element opposite to the locking element.

* * * * *